United States Patent [19]

Peters et al.

[11] 3,941,399

[45] Mar. 2, 1976

[54] BARREL CARRIER

[76] Inventors: Jack Peters, 24008 Bessemer St., Woodlands Hills, Calif. 91364; DeLoris Joan Barrett, 6206 Satsuma Ave., North Hollywood, Calif. 91606

[22] Filed: July 8, 1974

[21] Appl. No.: 486,942

[52] U.S. Cl. .............................. 280/47.29; 214/383
[51] Int. Cl.² ............................................. B62D 1/14
[58] Field of Search ........... 280/47.28, 47.29, 47.27; 214/384, 383, 382

[56] References Cited
UNITED STATES PATENTS

| | | | |
|---|---|---|---|
| 2,779,492 | 1/1957 | Lapham | 214/383 |
| 2,922,658 | 1/1960 | Manahan | 280/47.29 |
| 3,079,168 | 2/1963 | Monroe et al. | 280/47.28 |
| 3,647,238 | 3/1972 | Mackey | 280/47.29 |

FOREIGN PATENTS OR APPLICATIONS

| | | | |
|---|---|---|---|
| 667,386 | 2/1952 | United Kingdom | 280/47.29 |
| 933,343 | 8/1963 | United Kingdom | 280/47.29 |

*Primary Examiner*—M. Henson Wood, Jr.
*Assistant Examiner*—John A. Pekar
*Attorney, Agent, or Firm*—Pollock, Vande Sande & Priddy

[57] ABSTRACT

A wheeled hand truck for barrels, drums, and similar heavy articles is disclosed which comprises a selectively pivotably load supporting foot plate and an adjustable barrel lip restraining hook which facilitate loading of barrels or drums onto the truck, the selectively pivotable load supporting plate also facilitating safe, compact storage of the device.

14 Claims, 8 Drawing Figures

BARREL CARRIER

SUMMARY OF THE INVENTION

Hand trucks have been in use for decades for moving heavy articles over relatively short distances. Such well-known devices typically comprise an elongated frame having handles at one end thereof and a pair of wheels at the other end, there being some sort of load supporting foot plate rigidly attached to the frame at a location generally between the wheels. The truck may also include an auxiliary set of wheels pivotably attached to the side opposite the foot plate. The truck may be set to roll on the pair of wheels located on the frame alone or in combination with the auxiliary wheels, as desired to minimize the amount of work to be expended by the handler. Copending application Ser. No. 299,563 filed Oct. 20, 1972 by Jack Peters and Easton D. New discloses such an auxiliary systems.

In use, the hand truck is brought to a location adjacent the article to be carried and the frame of the truck is raised to an essentially vertical location so that the load supporting foot plate may be forced under the article to be carried. The hand truck is then pulled back away from the article, causing the load supporting foot plate to lift the article and cause it to slide back against the hand truck frame.

Hand trucks of the known type have several disadvantages. In those which include some means for attachment to the upper surface or peripheral lip of the article to be carried, it is necessary to tip truck frame toward the article to be carried so that the restraining means may engage the article, during which the load supporting foot is caused to pivot about its leading edge, thereby placing the load supporting surface of the foot at an angle to the bottom surface of the article to be carried. The operator must then manually force the load supporting foot under the article to be carried so that the article is caused to move up the inclined load supporting foot until contact is made with the frame of the hand truck. Obviously, this mode of use requires considerable effort by the operator and places the hand truck in a relatively unstable position while it is resting on the leading edge of the load supporting foot. In addition, the outwardly extending load supporting foot occupies a substantial amount of space when the hand truck is not in use, particularly when the truck is resting on its auxiliary wheels. Thus, the load supporting foot geometry of conventional hand trucks presents a hazard to passersby and occupies a considerable amount of storage space.

An object of applicants' invention is to rectify these deficiencies of prior art devices by providing in a hand truck a selectively adjustable load bearing foot plate which is attached to the frame of the truck so as to permit movement of the truck frame about the foot plate while the foot plate remains in total, flat contact with the adjacent supporting surface.

A further object is to provide resilient means for restraining the upper end of the article to be carried while the article is being transferred to the truck and moved from place to place.

Still another object of the invention is to provide a hand truck which may be partially collapsed at its load supporting foot, to facilitate storage and minimize hazards to the operator and passersby.

Another object of the invention is to provide a load supporting shoe having wedge or ramp surfaces thereon to facilitate loading and unloading of an article to be carried.

DETAILED DESCRIPTION OF THE PREFERRED EMBODIMENT

There follows a detailed description of a preferred embodiment of the invention, reference being had to the drawings in which like numerals designate like elements of structure in each of the several Figures.

Figure 1:
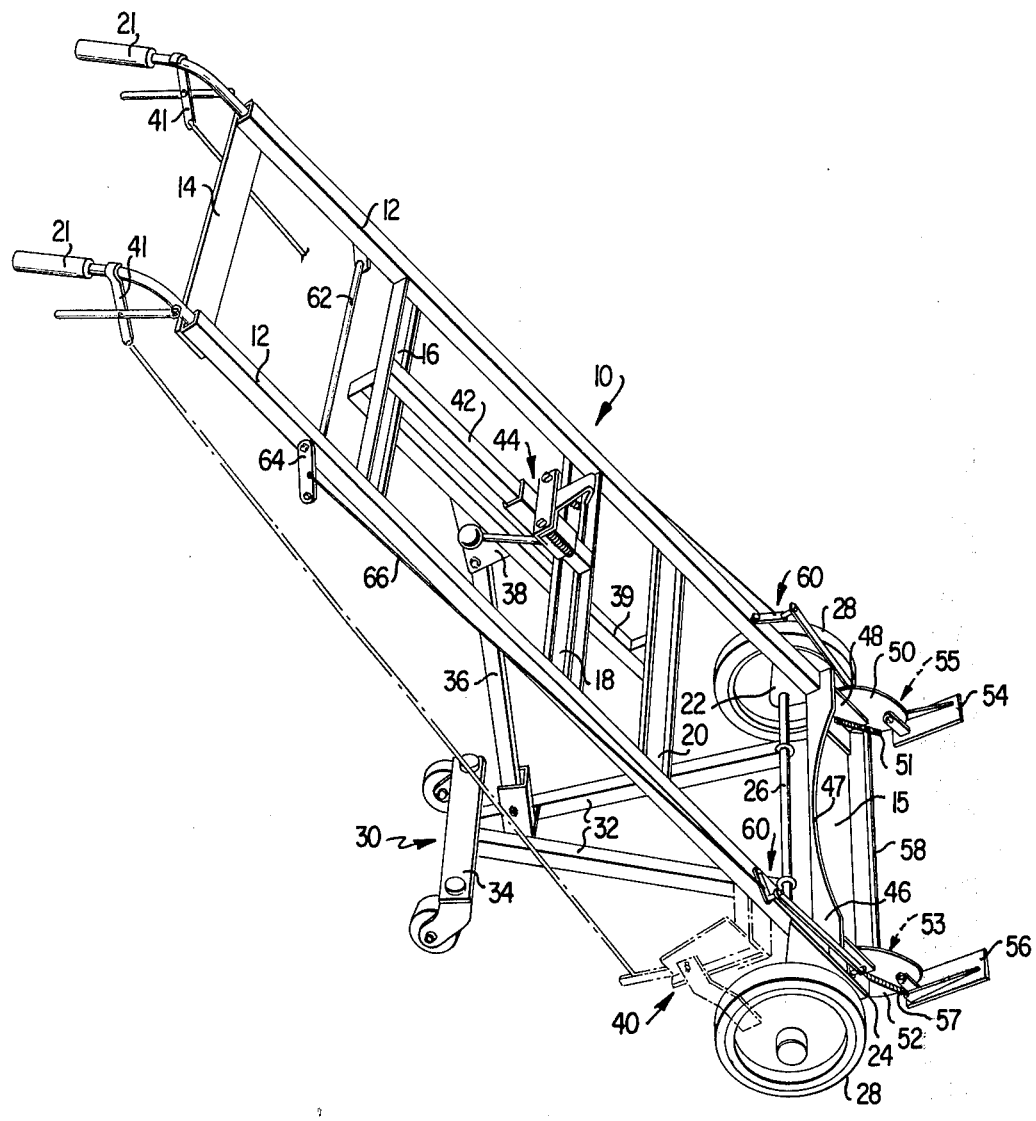
FIG. 1 shows a perspective view of a hand truck embodying the invention taken from an overhead aspect.

FIG. 1 shows a perspective view of a hand truck embodying the invention, taken from an aspect above and slightly to the front of the apparatus. An elongated frame 10 includes side rails 12 which are joined by upper and lower lateral brace plates 14 and 15 and upper, middle and lower lateral brace beams 16, 18 and 20 into a rugged frame suitable use in carrying heavy articles such as fifty gallon drums. The side rails may be of square steel tubing and the lateral brace plates and beams of bar stock and channel configurations which are commonly available. Affixed to one end of elongated frame 10 are operating handles 21 which are gripped by the handler of the device in use.

At the end of elongated frame 10 opposite handles 21 are left and right wheel support plates 22 and 24 which are welded or otherwise suitably fastened to side rails 12 and extend in a generally triangular form to the rear of frame 10. Rigidly attached to the rear most portion of wheel support plates 22 and 24 is wheel axle 26 upon the outer ends of which are rotatably mounted wheels 28. The hand truck of this invention is shown with a conventional auxiliary wheeled support attached, as generally indicated by numeral 30. The auxiliary support comprises lateral braces 32 which are pivotably connected to axle 26 at one end and rigidly attached to auxiliary wheel assembly 34 at the other end. A support strut 36 pivotably connects the auxiliary wheel assemblies 34 and lateral braces 32 to pivot support 38. Support 38 is mounted for movement longitudinally of elongated frame 10 on support bar 39, which is rigidly attached to lateral brace beams 16 and 20 as indicated. Attached to frame 10 at a location just above each wheel 28 is caliper brake assembly 40, shown in phantom. The details of brake assembly 40 do not comprise a portion of this invention and are set forth in application Ser. No. 486,704 filed July 8, 1974 by the same applicants. A brake actuating mechanism 41 is pivotably attached to handles 21. Between lateral brace beams 16 and 18 is attached barrel hook support bar 42 on which barrel hook assembly 44 is slidably mounted.

At the lower end of elongated frame 10 at a location between wheels 28 is located barrel cradle 46 fabricated of bar stock and oriented at approximately right angles to lower lateral brace plate 15. Barrel cradle 46 is cut away at the leading edge thereof to form a curved support surface 47 which will generally accommodate the exterior shape of barrels or casks carried on the hand truck. Removably attached to the edges of lower lateral brace plate 15 are leg support elements 48 which may be short sections of angle iron as shown. Pivotably connected to the leg supports 48 are left and right shoe legs 50 and 52 of suitable plate stock to which are pivotably connected load supporting shoes 54 and 56. Shoe legs 50 and 52 are resiliently restrained by springs 53 (not shown in this view) and 51 and load supporting shoes 54 and 56 are resiliently restrained by springs 55 (not shown in this view) and 57. Running between shoe legs 50 and 52 and rigidly connected thereto is stabilizing bar 58 which serves to synchronize the movement of shoe legs 50 and 52 during use of the device, as described hereafter. Attached to side rails 12 on each side of the hand truck are shoe leg locking mechanisms 60, described more fully with reference to FIGS. 2, 3 and 4. A locking mechanism actuating handle 62 is attached via pivot links 64 to elongated frame 10 at a location convenient for actuation by an operator of the hand truck who may move handle 62, thereby pivoting links 64 and pulling cables 66 to actuate shoe leg locking mechanisms 60.

Figure 2:
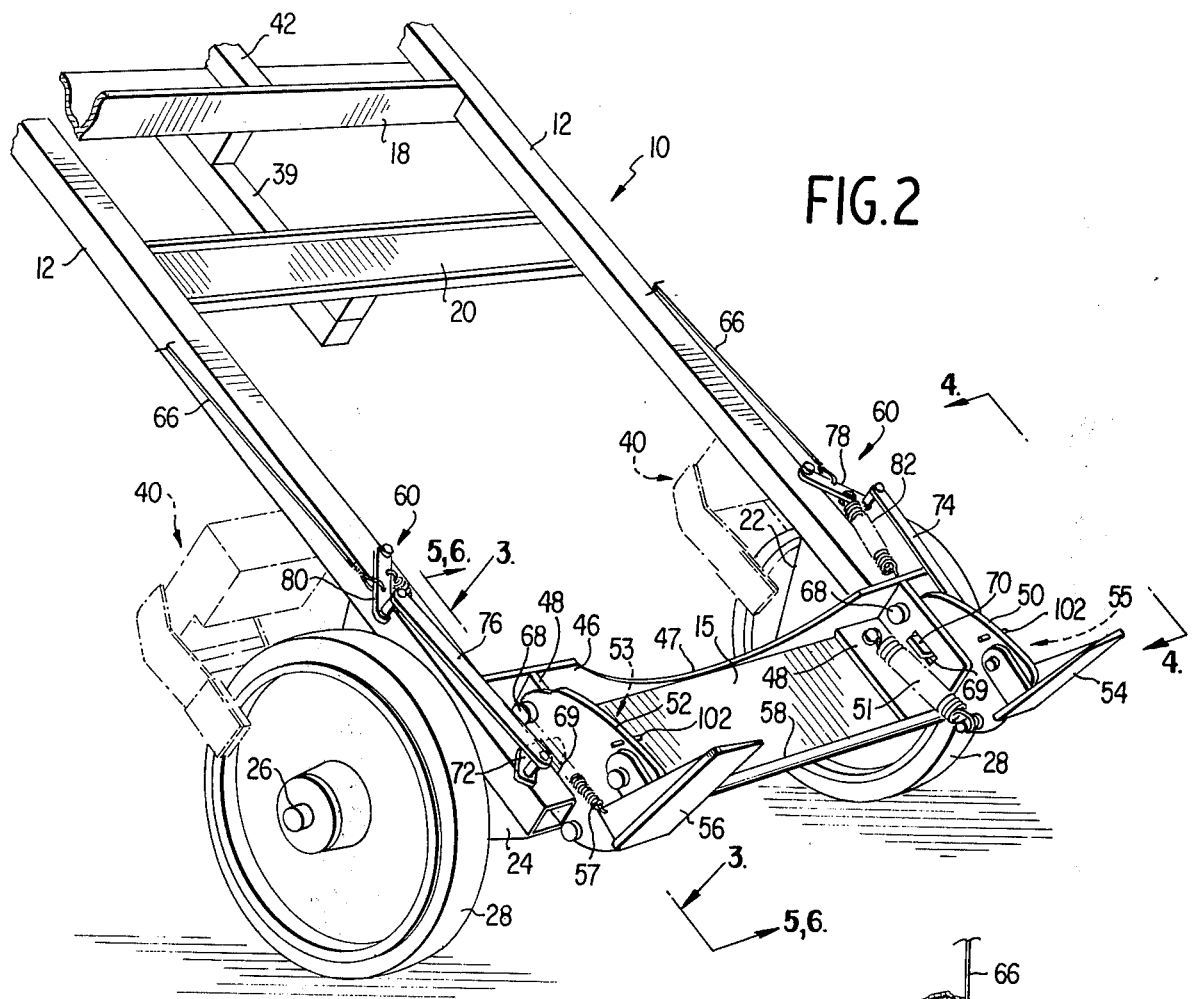
FIG. 2 shows a perspective view of the lower portion of a hand truck embodying the invention, indicating the selectively pivotable load bearing foot plates.
Figure 3:
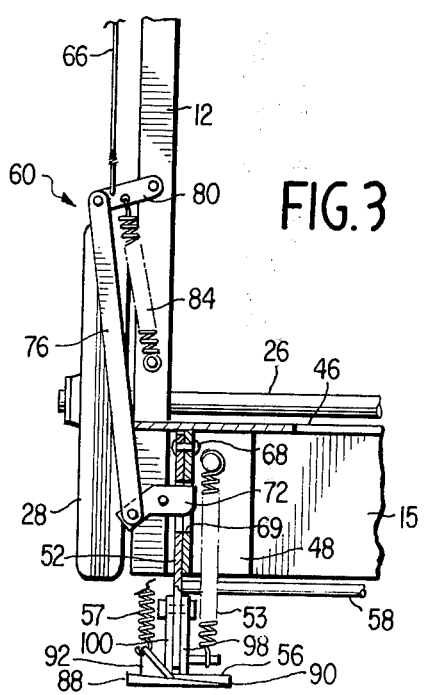
FIG. 3 shows an elevation view partially in section taken along line 3—3 of FIG. 2.
Figure 4:
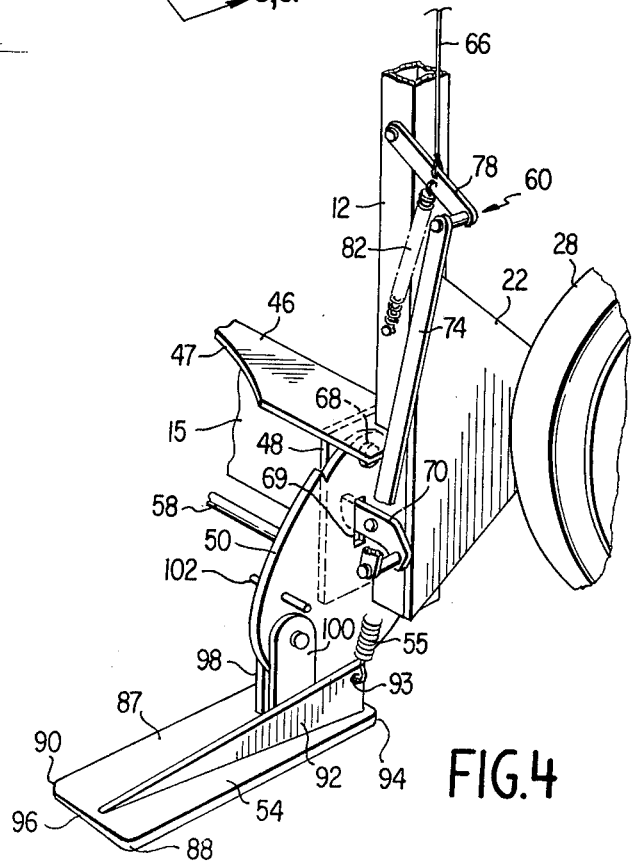
FIG. 4 shows a perspective view, partially broken away, of the lower left-hand portion of the hand truck viewing along a line 4—4 as shown in FIG. 2.

Referring now to FIGS. 2, 3 and 4, the interconnection and operation of shoe legs 50 and 52, load supporting shoes 54 and 56 and shoe leg locking mechanisms 60 may be understood. Shoe legs 50 and 52, made from elongated flat blanks, are pivoted at one end to leg supports 48 by suitable means such as bolts 68. Passing through both shoe legs 50 and 52 and leg supports 48 are aligned keyways 69 into which extend shoe leg latching keys 70 and 72 which are pivoted as shown to the lower end of side rails 12. The latching keys serve to rigidly hold shoe legs 50 and 52 in a preselected position as will be further described with regard to FIGS. 5 and 6. The latching keys are rotated into and out of keyways 69 by key actuating levers 74 and 76 pivoted thereto which, in turn, are actuated by pivot links 78 and 80, pivotably attached to side rails 12. The three-bar linkage on each side rail 12 comprised of the shoe leg latching keys 70 and 72, key actuating levers 74 and 76 and the pivot links 78 and 80 are spring biased into a position where the latching keys 70 and 72 are inserted into aligned keyways 69 in leg supports 48 and shoe legs 50 and 52. Pivot links 78 and 80 are attached for actuation to cables 66 which, as previously discussed, are attached to pivot links 64 at the upper end of elongated frame 10.

With particular reference to FIG. 4, the unique geometry of applicants' load supporting shoes may be seen. For ease of discussion, only load supporting shoe 54 and its attachment to shoe leg 50 are shown; however, it will be understood that load supporting shoe 56 and its attachment to shoe leg 52 are identical in function and mirror images in structure to the elements shown in FIG. 4. Each load supporting shoe comprises a base plate 87 of substantially rectangular configuration. Between the outboard leading corner 88 and the inboard corner 90 of each load supporting shoe, the leading edge 96 of the shoe tapers from corner 88 to corner 90. Attached to the upper surface of base plate 87 is an upstanding wedge-shaped element 92 which tapers from approximately the center of leading edge 96 to the outboard trailing corner 94 of base plate 87. The lower surface of each shoe is flat and lies in a plane extending from the leading to the trailing edge of the shoe. Located near the upper most portion of wedge element 92 is a bore 93 which provides an attachment point for one of biasing springs 55 and 57 which are attached at their opposite ends to barrel cradle 46. The load supporting shoe assembly is pivotably connected to shoe leg 50 by pivot connector arms 98 and 100. The connection of biasing spring 55 between barrel cradle 46 and upstanding wedge 92 is so oriented that as load supporting shoe 54 is rotated upward relative to leg 50, the biasing spring will pass over the pivot point between load supporting shoe and its leg and pull the load supporting shoe into connect with stop 102 on leg 50. (See also FIGS. 5 and 6.)

Figure 6:
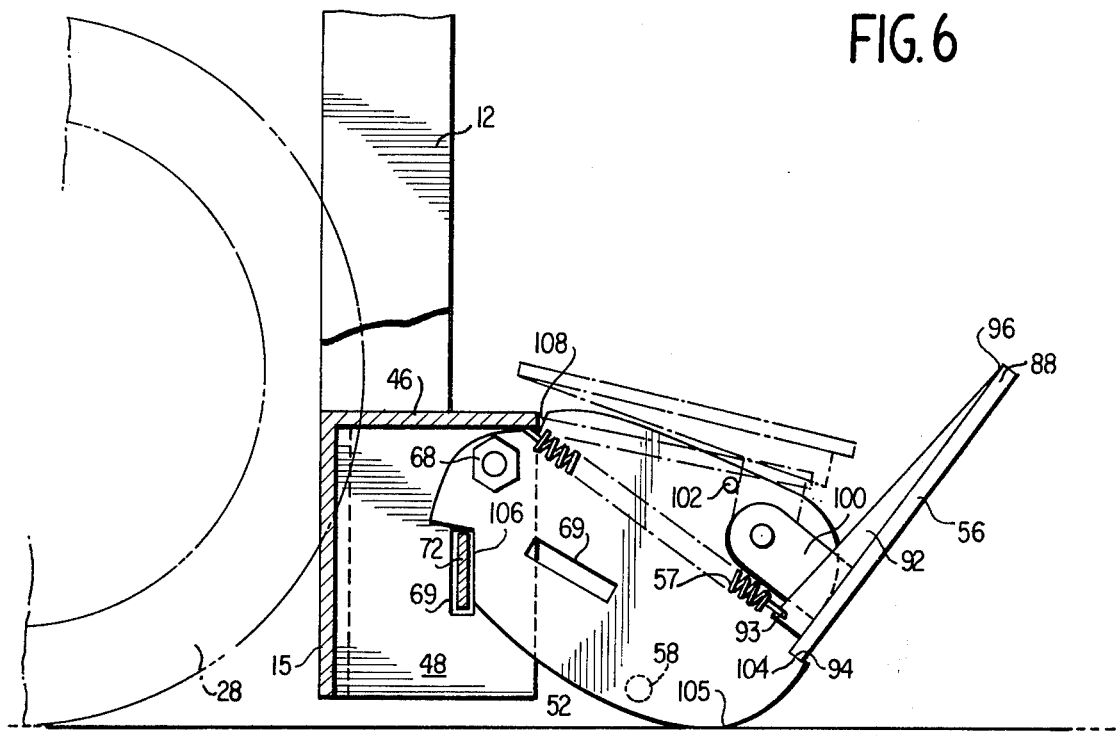
FIGS. 5 and 6 show two views, partially in section, taken along line 5+6—5+6 of FIG. 2, illustrating alternate positions of the support legs and load supporting shoes of the invention.
Figure 5:
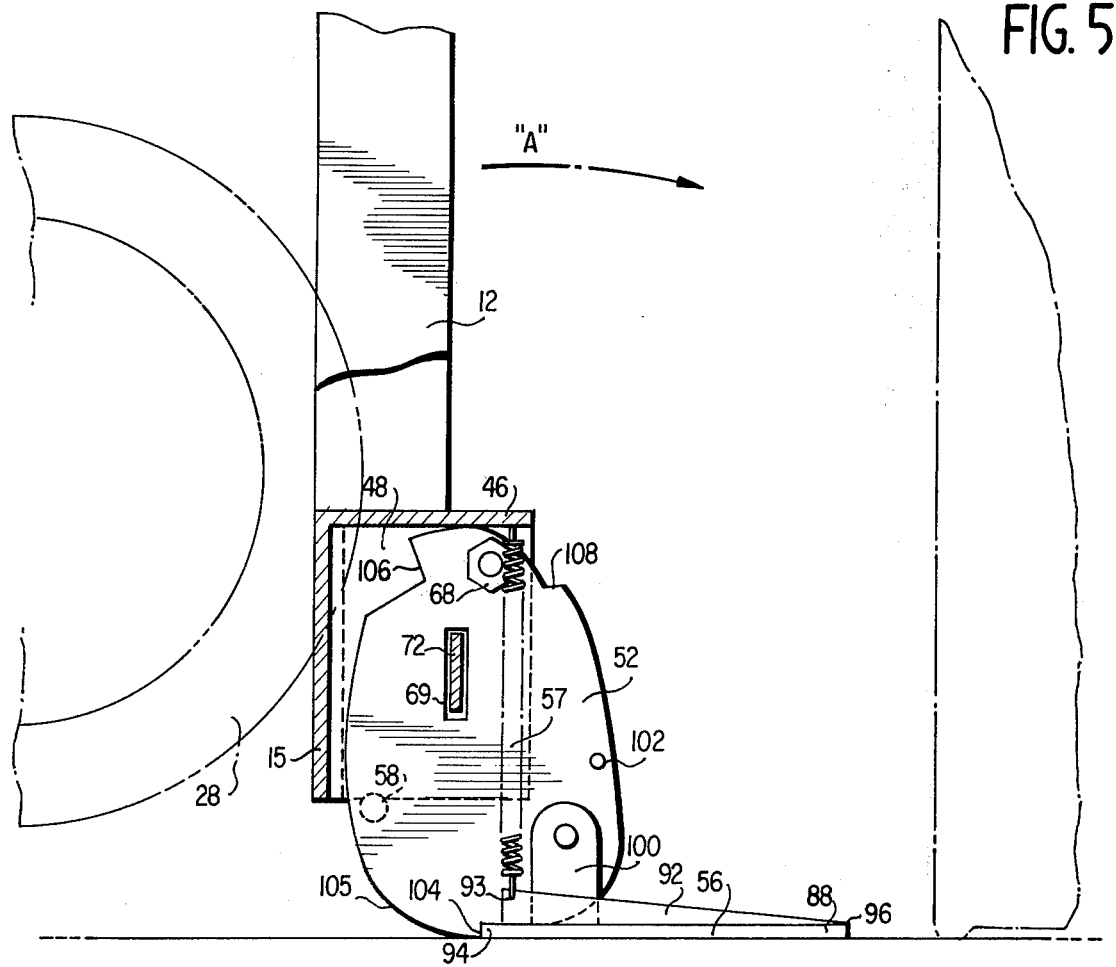

Referring now to FIGS. 5 and 6, the alternate position and functions of shoe legs 50 and 52 and load supporting shoes 54 and 56 may be seen. In FIG. 5, the shoe leg 52 is shown in its operating position wherein locking key 72 has been located in aligned keyways 69 under the action of spring 84. In this position, elongated frame 10 may be rotated toward the article to be carried, such as the barrel shown in phantom, so that the entire weight of the hand truck is borne on shoe legs 50 and 52 and load supporting shoes 54 and 56. As shown in FIG. 5, load supporting shoes 54 and 56 remain in total flat contact with the load supporting surface after wheels 28 have left the load supporting surface and will remain in flat contact as elongated frame is rotated in the direction of arrow "A" toward the article to be carried.

In FIG. 6, the hand truck is shown in the "at rest" position. Shoe legs 50 and 52 have been rotated relative to leg supports 48 by disengaging latching keys 70 and 72 from keyways 69 via locking mechanism handle 62, as previously discussed. To retain shoe legs 50 and 52 in the at rest position, the shoe legs are provided with peripherally located stop surfaces 106 and 108 which abutt the upper and side surfaces of shoe leg latching keys 70 and 72 and the leading edge of barrel cradle 46. Load supporting shoe 56 is shown in solid lines in its normal or operating position wherein spring 57 biases the rear edge of the base plate 87 into contact with peripherally located stop surface 104 and shoe leg 52. In this position, the shoe leg may present a hazard to passersby; thus, it may be rotated for safety to the position shown in phantom in which the pivot connector arms 98 and 100 abutt stop 102. Since wheels 28 extend axially beyond the lower end of the frame as shown most clearly in FIGS. 5 and 6, the truck is supported on the wheels and curved surfaces 105 of legs 50 and 52 in the at rest position.

Figure 7:
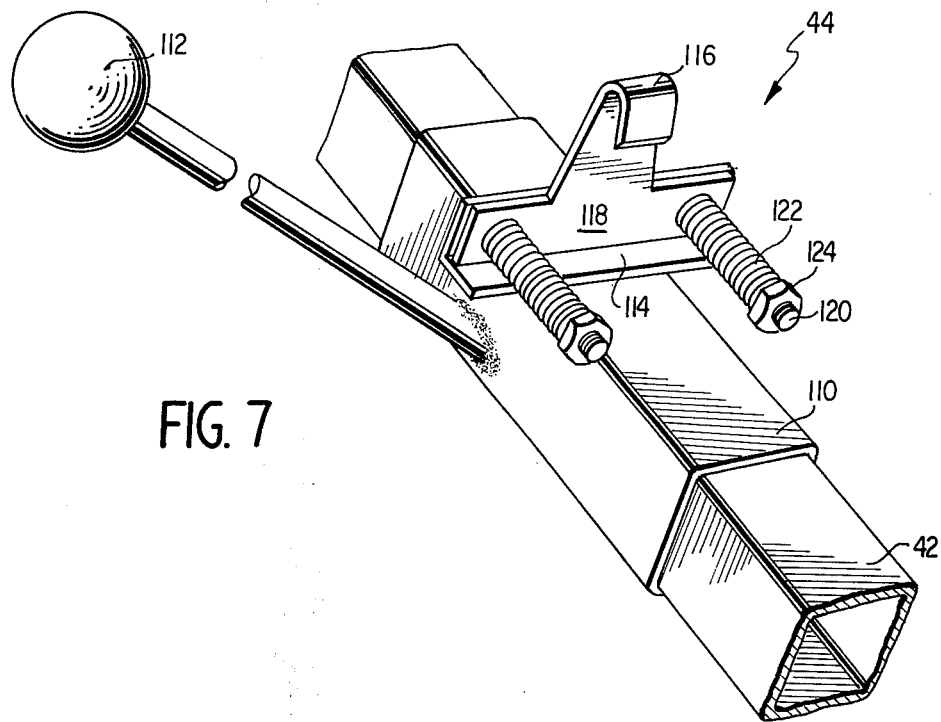
FIGS. 7 and 8 show perspective and side elevation views, respectively, of the restraining hook and resilient mount, according to the invention.
Figure 8:
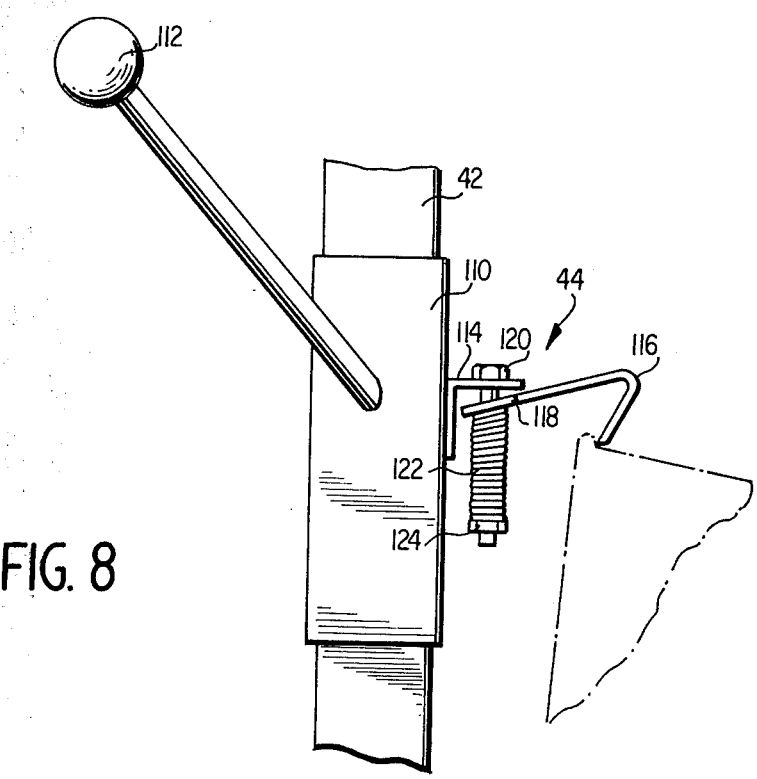

Referring now to FIGS. 7 and 8, the structure of the barrel hook assembly 44 may be understood. The barrel hook support bar 42 is of square or rectangular cross section and has slidably mounted thereon a barrel hook guide sleeve 110 which may be moved via actuating handle 112 longitudinally along support bar 42 as desired to accommodate barrels or other articles of differing vertical heights. Rigidly affixed to guide sleeve 110 is angle bracket 114 to which barrel hook 116 is resiliently attached. Barrel hook 116 has integrally attached to the base thereof a support flange 118 which extends laterally on either side of hook 116. Angle bracket 114 and support flange 118 include aligned bores for receiving bolts 120 on which are mounted springs 122 and nuts 124 as shown. This arrangement of parts permits the barrel hook and its support flange to move relative to angle bracket 114 to accommodate movement of the barrel or articles to be carried, as indicated in phantom in FIG. 8.

In operation, the hand truck comprising applicants' invention is wheeled to a location adjacent the barrel or article to be carried and shoe legs 50 and 52 are placed in the operating position indicated in FIG. 5. At this time elongated frame 10 may be raised to an essentially vertical position moving from wheels 28, to curved surface 105 of support legs 50 and 52, and onto shoes 50 and 52. As shown in FIG. 5, the rear surface of each load supporting shoe abutts peripheral stop surface 104 in each shoe leg and the lower surface of the load supporting shoes remains in total, flat contact with the supporting surface. Then, frame 10 may be moved toward the barrel or article to be carried until barrel hook assembly 44 is situated above the lip or upper surface of the barrel as indicated in FIG. 8. Contact with the barrel lip is ensured by pressure on handle 112. At this point, the operator may either force load supporting shoes to slide along the load surface and, through the action of tapered leading edges 96 and upstanding wedge portions 92, force the load supporting shoes to pass beneath the barrel; or he may tip the barrel slightly relative to the hand truck so as to permit the shoes to enter more easily beneath it. Then, the hand truck is rotated in the opposite direction so that the elongated frame 10 pivots back along curved surface 105, while barrel hook assembly 44 continues to resiliently engage the barrel lip, until wheels 28 contact the supporting surface once again. The barrel or other article may then be delivered to its desired destination. To unload the barrel from the hand truck, the elongated frame is once again raised to the vertical position shown in FIG. 5 and barrel hook assembly 44 is disengaged by sliding guide sleeve 110 upward along support bar 42. The load supporting shoes may then be withdrawn from beneath the barrel, an operation which is eased by the sloping portion of wedges 92. If the hand truck is not to be in use for a period, the shoe legs 50 and 52 may be rotated to the position shown in FIG. 6 by disengaging the shoe leg latching keys 70 and 72 using handle 62, located at the opposite end of the elongated frame 10. In this position of shoe legs 50 and 52, the hand truck of the invention may be positioned vertically as shown in FIG. 6 resting on wheels 28 and curved surfaces 105 of shoe legs 50 and 52. To minimize any potential hazard to passersby due to the outwardly extending leading edges of load supporting shoes 54 and 56, the shoes may be rotated on pivot connector arms 98 and 100 to a safety position as shown in phantom in FIG. 6.

Having described our invention in a manner so as to enable one of ordinary skill in the art to make and use the same, we claim:

1. A hand truck comprising:
   an elongate frame;
   an axle and wheels assembly affixed to one end of said frame for rolling the truck on a support surface;
   at least one load supporting shoe having a flat lower surface below the level of said axle when the hand truck is in a vertical position, each said shoe having a forward toe portion and a rearward heel portion,
   means connecting said shoe to said frame,
   said shoe being pivotally supported on said connecting means, said connecting means defining a continuously curved surface extending from the heel of said shoe rearwardly in a direction toward said axle to permit rocking of said hand truck about pivot points progressively moving along said curved surface as said hand truck pivots between a position in which said lower surface of the shoe is in contact with the support surface and a position in which said wheels contact said support surface,
   whereby no discontinuity is required in the forces required to be exerted on said frame to rock said hand truck forwardly or rearwardly between said vertical position and a rearwardly tilted position in which a load on said at least one shoe is fully supported on said wheels.

2. A hand truck according to claim 1, further comprising:
   a restraining hook element for engagement with an upper portion of an article to be carried on the hand truck;
   means for mounting the restraining hook element for vertical adjustment relative to the elongated frame at a location above the load supporting shoe, the mounting means including means for resiliently supporting the restraining hook element.

3. A hand truck according to claim 2, wherein the hook element includes a laterally extending support flange at the base thereof; and the mounting means comprises an angle bracket horizontally, movably mounted for vertical motion on the frame adjacent the support flange and means for resiliently mounting the support flange to the angle bracket.

4. A hand truck according to claim 1, wherein the shoe legs comprise elongated plate members pivoted at one end to the elongated frame, said plate members including keyways therethrough and peripheral, projecting stop surfaces thereon; said locking means comprising resiliently biased key elements attached to the elongated frame for coaction with said keyways in one of said plurality of positions and with said stop surfaces in another of said plurality of positions.

5. A hand truck according to claim 4, further comprising means attached to the elongated frame for selectively removing said key elements from said keyways to permit rotation of said shoe legs from said one position and returning said key elements to permit said peripheral stop surfaces to contact said key elements, in said other position.

6. A hand truck according to claim 4, wherein said plate members include curved peripheral surfaces located at the other end thereof to facilitate pivoting said elongated frame.

7. The hand truck of claim 1 wherein said connecting means comprises a pair of shoe legs pivotally attached to said one end of said frame at laterally spaced locations, and pivot means joining each shoe leg to a respective load supporting shoe.

8. The hand truck of claim 7, wherein said shoe legs are pivotable to a position in which a portion of said curved surface lies in the same plane as the bottom portion of said wheels while said hand truck is substantially in a vertical position to support said hand truck in a free-standing manner on the support surface.

9. A hand truck according to claim 7, wherein said connecting means comprise elongated plate members pivoted at one end to the elongated frame, said plate members including keyways therethrough and peripheral, projecting stop surfaces thereon; said locking means comprising resiliently biased key elements attached to the elongated frame for coaction with said keyways in one of said plurality of positions and with said stop surfaces in another of said plurality of positions.

10. A hand truck according to claim 9, further comprising means attached to the elongated frame for selectively removing said key elements from said keyways to permit rotation of said connecting means from said one position and returning said key elements to permit said peripheral stop surfaces to contact said key elements, in said other position.

11. A hand truck according to claim 10, wherein said plate members include curved peripheral surfaces located at the other end thereof to facilitate pivoting said elongated frame.

12. The hand truck of claim 1 wherein there are two load supporting shoes extending forwardly at substantially a right angle to said axle, each said shoes having an upwardly extending wedge element on the upper surface thereof which tapers from a maximum height adjacent said heel portion to a minimum height near the toe portion, each said wedge being slanted at an acute angle relative to said axle.

13. The hand truck of claim 12 wherein each said wedge is slanted so that its end adjacent the toe end of the relevant shoe lies inwardly of the opposite end of said wedge.

14. A hand truck comprising:
an elongated frame;
an axle and wheels assembly affixed to one end of the frame for rolling the truck on a support surface;
at least one load supporting shoe having a lower surface;
a pair of shoe legs pivotably attached to the one end of the elongated frame at laterally spaced locations;
pivot means joining the shoe legs to the load supporting shoe; and
means attached to the elongated frame for locking the shoe legs in a plurality of positions relative to the elongated frame, whereby the frame may be pivoted into a position relative to the support surface wherein the truck is supported by the load supporting shoe and then pivoted toward an article to be carried on the load supporting shoe while maintaining the lower surface of the shoe in contact with the support surface.

* * * * *